H. E. GOFF.
ATTACHMENT FOR PEA AND BEAN VINERS.
APPLICATION FILED JAN. 2, 1917.
1,303,195.
Patented May 6, 1919.
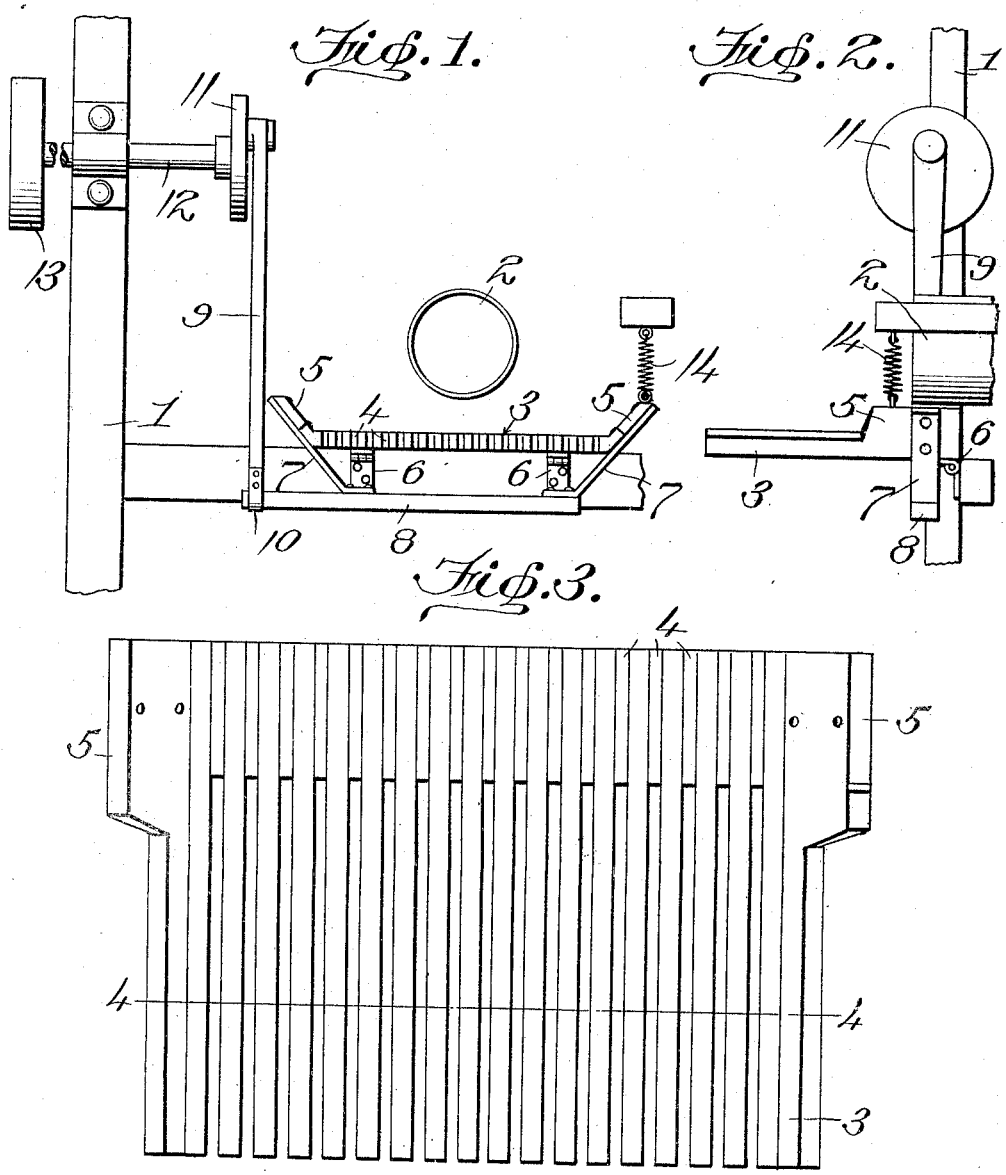

UNITED STATES PATENT OFFICE.

HOWARD E. GOFF, OF AUBURN, NEW YORK.

ATTACHMENT FOR PEA AND BEAN VINERS.

1,303,195.     Specification of Letters Patent.     Patented May 6, 1919.

Application filed January 2, 1917. Serial No. 140,210.

*To all whom it may concern:*

Be it known that I, HOWARD E. GOFF, a citizen of the United States, residing at Auburn, in the county of Cayuga, State of New York, have invented certain new and useful Improvements in Attachments for Pea and Bean Viners; and I do hereby declare the following to be a full, clear, and exact description of the invention, such as will enable others skilled in the art to which it appertains to make and use the same.

This invention relates to attachments for machines for threshing peas and beans, and more particularly relates to an attachment for a pea and bean vining machine.

The object of this invention is to provide a shaking attachment for use upon vining machines by means of which peas and beans are threshed out of the vines, the attachment acting as an agitator to more thoroughly clean the pods of beans or peas than has heretofore been the case with those machines which are known to me. Thus, my invention consists in the provision of a shaking device at the delivery end of a viner where it may catch the vines and pods and impart to them a final agitating action to remove those peas or beans which may have adhered to the vines, thereby increasing the yield of the crop for carrying purposes.

With the above objects in view and such others as may hereinafter appear, my invention will now be fully set forth and described, reference being had to the accompanying drawings.

In the drawings:—

Figure 1 is a rear view of a part of a pea or bean vining machine having my invention applied thereto, Fig. 2 is a side elevation, Fig. 3 is a plan view of the screening device, and Fig. 4 is a section on line 4—4 of Fig. 3.

Referring more particularly to the drawings, 1 represents the frame of the rear portion of a vining machine, adjacent the delivery opening 2, through which the threshed vines issue. Hinged to the rear part of the casing of the machine below the opening 2 is the shaker screen 3. Said screen is built up of a plurality of longitudinal wooden bars, which may be of maple, and which I have found, in practice, may be advantageously formed about one inch in width and one-half in breadth, though, obviously, I do not in any manner desire to limit myself to these dimensions. The bars are placed on edge and are secured side by side in spaced relation, preferably one-half inch apart by means of short spacer blocks 4 at the rear end of the shaker frame. Obviously, the distance between the bars will be determined by the requirement of the particular machine upon which the shaker is mounted. The shaker is inclosed at the sides by means of the side pieces 5 which incline outwardly, and are preferably reduced at the forward end of the frame from which the vines are eventually thrown. A plurality of hinges 6 support the shaker upon the machine, and permit a vertical reciprocation of the shaker. Extending below the shaker, and secured to the side beams 5 are the brackets 7 across which is secured the transverse supporting bar 8. At one side of the shaker, the bar 8 is extended and is secured at its extremity to the vertical pitman 9, as by a clamp member 10. The upper end of the pitman 9 is vertically secured to a crank pulley 11 carried by one end of a shaft 12 having its bearings on the frame beams 1. The opposite end of the shaft 12 carries a drive pulley 13 which is suitably secured to any of the drive shafts of the machine.

Opposite the pitman side of the shaker, the latter is provided with a spring member 14 which has its upper end secured to any suitable frame member of the machine, said spring 14 supporting the shaker against undue downward movement while permitting its proper reciprocation in order to shake the vines.

In operation, the shaker provides an extension device for the machine whereby the vines are passed through an additional operation before being cast away and that the vines pass out of the usual delivery opening 2 and falling upon the shaker are freed of any peas or beans which may have adhered to the vine in spite of the threshing operation within the machine. After the vines are shaken, they pass off of the free end of the shaker while the gathered products are dropped through the bars of the shaker into any suitable receptacle.

It is obvious that this attachment acts as a cleaner for recovering products which have heretofore gone to waste, and that the vertical action of the screen is a different one from any which goes on within the machine so that it insures the vines being freed of any beans which are otherwise carried away with the device.

What I claim as my invention is:—

1. An attachment for pea and bean viners, including a shaker frame hinged at its rear end for vertical reciprocation, a resilient supporting means for the intermediate portion of one side of the frame and a member connected with the other side of the frame for vertically reciprocating the frame.

2. An attachment for pea and bean viners, including a frame comprising a plurality of spaced bars connected at one end and having their other ends freely vibratory, a hinged mounting for the frame at the connected ends of the bars permitting vertical reciprocation of the frame and means for vertically reciprocating the frame including a bar extended transversely under the frame and spaced therebelow and connected with the sides of the frame.

3. An attachment for pea and bean viners including a movable frame comprising a plurality of spaced bars mutually connected at one end and having their other ends freely vibratory, upwardly divergent side members carried by the outermost bars, brackets connecting the side members with the outermost bars and extending below the latter, a transverse bar connecting the brackets and means connected with the transverse bar for shaking the frame.

In testimony whereof, I affix my signature in the presence of two witnesses.

HOWARD E. GOFF.

Witnesses:
WM. H. SHELDON,
FRANK H. FINCH.

Copies of this patent may be obtained for five cents each, by addressing the "Commissioner of Patents, Washington, D. C."